(12) United States Patent
Brown et al.

(10) Patent No.: US 11,755,327 B2
(45) Date of Patent: Sep. 12, 2023

(54) DELIVERING IMMEDIATE VALUES BY USING PROGRAM COUNTER (PC)-RELATIVE LOAD INSTRUCTIONS TO FETCH LITERAL DATA IN PROCESSOR-BASED DEVICES

(71) Applicant: Microsoft Technology Licensing, LLC, Redmond, WA (US)

(72) Inventors: Melinda Joyce Brown, Raleigh, NC (US); Michael Scott Mcilvaine, Raleigh, NC (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/806,342

(22) Filed: Mar. 2, 2020

(65) Prior Publication Data

US 2021/0271480 A1 Sep. 2, 2021

(51) Int. Cl.
*G06F 9/32* (2018.01)
*G06F 9/30* (2018.01)
(Continued)

(52) U.S. Cl.
CPC .......... *G06F 9/321* (2013.01); *G06F 9/30054* (2013.01); *G06F 9/381* (2013.01); *G06F 9/3867* (2013.01); *G06F 9/544* (2013.01)

(58) Field of Classification Search
CPC .... G06F 9/321; G06F 9/3867; G06F 9/30054; G06F 9/381; G06F 9/544; G06F 9/324;
(Continued)

(56) References Cited

U.S. PATENT DOCUMENTS 6,253,308 B1  6/2001  Kawasaki et al.
2008/0022080 A1* 1/2008 Craske .................. G06F 9/3017
712/225

(Continued)

OTHER PUBLICATIONS

"ARM Compiler" In armasm User Guide, Version 6.01, Dec. 31, 2014, 200 Pages.

(Continued)

*Primary Examiner* — Shawn Doman
(74) *Attorney, Agent, or Firm* — Withrow & Terranova, PLLC

(57) ABSTRACT

Delivering immediate values by using program counter (PC)-relative load instructions to fetch literal data in processor-based devices is disclosed. In this regard, a processing element (PE) of a processor-based device provides an execution pipeline circuit that comprises an instruction processing portion and a data access portion. Using a literal data access logic circuit, the PE detects a PC-relative load instruction within a fetch window that includes multiple fetched instructions. The PE determines that the PC-relative load instruction can be serviced using literal data that is available to the instruction processing portion of the execution pipeline circuit (e.g., located within the fetch window containing the PC-relative load instruction, or stored in a literal pool buffer), The PE then retrieves the literal data within the instruction processing portion of the execution pipeline circuit, and executes the PC-relative load instruction using the literal data.

12 Claims, 10 Drawing Sheets

(51) Int. Cl.
    *G06F 9/38*      (2018.01)
    *G06F 9/54*      (2006.01)

(58) Field of Classification Search
    CPC ........ G06F 9/325; G06F 9/355; G06F 9/3557; G06F 9/3832
    USPC ........................................................ 712/225
    See application file for complete search history.

(56) References Cited

U.S. PATENT DOCUMENTS

| | | | | |
|---|---|---|---|---|
| 2014/0281137 | A1* | 9/2014 | Circello | G06F 12/1425 |
| | | | | 711/103 |
| 2015/0254078 | A1* | 9/2015 | Desai | G06F 9/30054 |
| | | | | 712/207 |
| 2016/0291981 | A1* | 10/2016 | Robatmili | G06F 9/3857 |
| 2017/0148132 | A1 | 5/2017 | Ishizaki | |
| 2017/0286116 | A1* | 10/2017 | Johar | G06F 9/3804 |
| 2019/0073481 | A1* | 3/2019 | Angelino | G06F 8/65 |
| 2020/0233672 | A1* | 7/2020 | Winrow | G06F 9/3848 |

OTHER PUBLICATIONS

"International Search Report and Written Opinion Issued in PCT Application No. PCT/US21/016491", dated May 21, 2021, 11 Pages.

* cited by examiner

DELIVERING IMMEDIATE VALUES BY USING PROGRAM COUNTER (PC)-RELATIVE LOAD INSTRUCTIONS TO FETCH LITERAL DATA IN PROCESSOR-BASED DEVICES

FIELD OF THE DISCLOSURE

The technology of the disclosure relates to execution of instructions, and, more particularly, to immediate-generating instructions used for generating large immediate values.

BACKGROUND

Conventional processor-based devices and their underlying instruction set architectures (ISAs) provide instructions for retrieving data on which arithmetic or other operations may be performed. Each such instruction may access data that is stored in, e.g., a memory or a register of the processor-based device, or may operate on an "immediate value" (i.e., a constant that is embedded as part of the instruction that employs it). In the latter case, the instruction does not require a memory address to access the immediate value, and may load the immediate value into a register for subsequent use.

One issue faced by processor-based devices in using immediate values is the generation of an immediate value that is large relative to the instruction size of the processor-based device. For example, assume that a processor-based device provides registers that are 64 bits in size, and employs instructions that are 32 bits in size. In such a processor-based device, there is no mechanism for loading a 64-bit immediate value directly into a register using a single immediate-generating instruction, and thus an alternate technique is required to generate the 64-bit immediate value. One approach makes use of a sequence of instructions, each of which contributes a portion of the desired 64-bit immediate value. However, this approach may require multiple fetch, decode, and/or execution lanes in the processor-based device, and may also result in decreased code density.

Another technique requires a variable length instruction set that provides larger instruction encodings that may be employed to communicate the 64-bit immediate value. This technique, though, may increase the complexity of fetches related to cache line and page-crossing instructions, and may require increased fetch bandwidth to fill instruction fetch lanes in the processor-based device. Additionally, decode complexity may increase due to the need to perform instruction boundary detection and to support multiple formats per instructions, and larger instruction resources may be required to hold very large instructions.

A third approach uses literal pools accessed via program counter (PC)-relative load instructions. As used herein, a "literal pool" refers to a block of data within an instruction stream that is used to store constant values (or "literals") as part of the instruction stream. A literal within the literal pool may then be accessed using a PC-relative load instruction that specifies an offset which, when added to the PC of the load instruction itself, indicates the memory location from which the literal is loaded. However, while this approach allows the use of a single, fixed length instruction, it requires that the literal be loaded from the memory location via a data cache or the system memory in a later data access portion of the execution pipeline of the processor-based device. This incurs increased latency for the delivery of the literal as an immediate value to dependent instructions, and risks resource hazards caused by using the data access portion of the execution pipeline for immediate value delivery.

Accordingly, it is desirable to provide a mechanism for generating large immediate values without requiring the use of multiple instructions or larger instruction encodings, while avoiding the penalties incurred by accessing literals via the data-access portion of the execution pipeline.

SUMMARY

Exemplary embodiments disclosed herein include delivering immediate values by using program counter (PC)-relative load instructions to fetch literal data in processor-based devices. In this regard, in one exemplary embodiment, a processing element (e.g., a processor core, as a non-limiting example) of a processor-based device provides an execution pipeline circuit that comprises an instruction processing portion and a data access portion. The instruction processing portion of the execution pipeline circuit includes circuits for fetching, decoding, and executing instructions in an instruction stream, as non-limiting examples, while the data access portion of the execution pipeline circuit includes circuits for, e.g., accessing data caches and performing writeback operations. Using a literal data access logic circuit, the PE detects a PC-relative load instruction within a fetch window that includes multiple fetched instructions. The PE determines that the PC-relative load instruction can be serviced using literal data that is available to the instruction processing portion of the execution pipeline circuit. For example, the literal data may be present within the fetch window containing the PC-relative load instruction, or may be included as part of a literal pool within the instruction stream that is retrieved and stored in a literal pool buffer. The PE then retrieves the literal data within the instruction processing portion of the execution pipeline circuit, and executes the PC-relative load instruction using the literal data. In this manner, the immediate value may be provided to instructions dependent on the PC-relative load instruction from the instruction processing portion of the execution pipeline circuit without incurring the overhead and penalties associated with retrieving the immediate value in the later data access portion of the execution pipeline circuit.

In another exemplary embodiment, a processor-based device is provided. The processor-based device includes a PE that comprises an execution pipeline circuit comprising an instruction processing portion and a data access portion. The PE further comprises a literal data access logic circuit. The PE is configured to detect, by the literal data access logic circuit, a PC-relative load instruction within a fetch window comprising a plurality of instructions of an instruction stream. The PE is further configured to determine that the PC-relative load instruction can be serviced using literal data available to the instruction processing portion of the execution pipeline circuit. The PE is also configured to, responsive to determining that the PC-relative load instruction can be serviced using the literal data available to the instruction processing portion of the execution pipeline circuit, retrieve, by the literal data access logic circuit, the literal data within the instruction processing portion of the execution pipeline circuit. The PE is additionally configured to execute the PC-relative load instruction using the literal data.

In another exemplary embodiment, a method for delivering immediate values by using PC-relative load instructions to fetch literal data is provided. The method comprises detecting, by a literal data access logic circuit of a PE of a processor-based device, a PC-relative load instruction within a fetch window comprising a plurality of instructions of an instruction stream. The method further comprises determining that the PC-relative load instruction can be serviced using literal data available to an instruction processing portion of an execution pipeline circuit. The method also comprises, responsive to determining that the PC-relative load instruction can be serviced using the literal data available to the instruction processing portion of the execution pipeline circuit, retrieving, by the literal data access logic circuit, the literal data within the instruction processing portion of the execution pipeline circuit. The method additionally comprises executing the PC-relative load instruction using the literal data.

In another exemplary embodiment, a non-transitory computer-readable medium having stored thereon computer-executable instructions is provided. The computer-executable instructions, when executed by a processor, cause the processor to detect a PC-relative load instruction within a fetch window comprising a plurality of instructions of an instruction stream. The computer-executable instructions further cause the processor to determine that the PC-relative load instruction can be serviced using literal data available to an instruction processing portion of an execution pipeline circuit. The computer-executable instructions also cause the processor to, responsive to determining that the PC-relative load instruction can be serviced using the literal data available to the instruction processing portion of the execution pipeline circuit, retrieve, by a literal data access logic circuit, the literal data within the instruction processing portion of the execution pipeline circuit. The computer-executable instructions additionally cause the processor to execute the PC-relative load instruction using the literal data.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure, FIG. 1 is a block diagram illustrating an exemplary processor-based device configured to deliver immediate values by using program counter (PC)-relative load instructions to fetch literal data;

Figure 1:
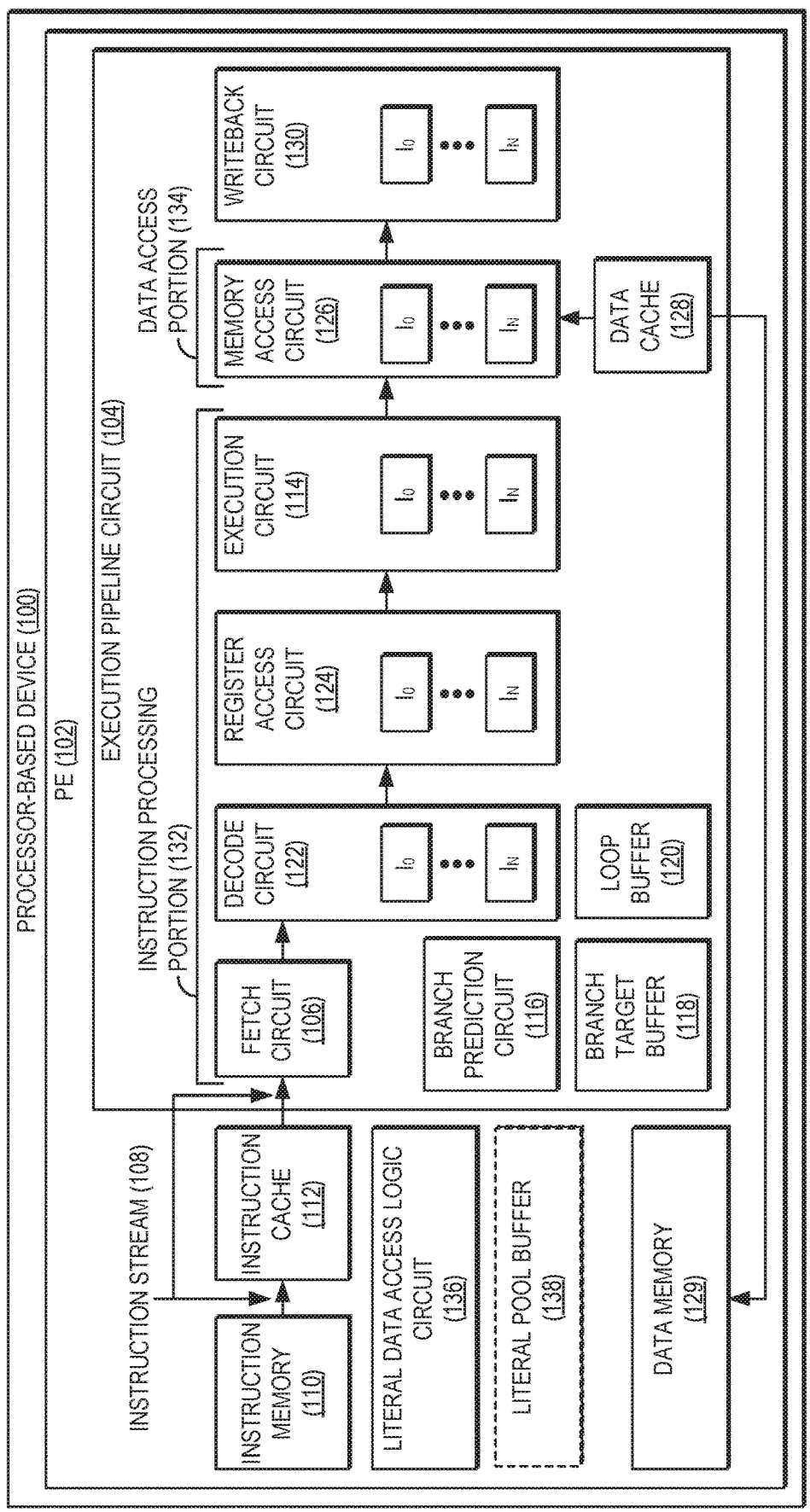
Figure 5A:
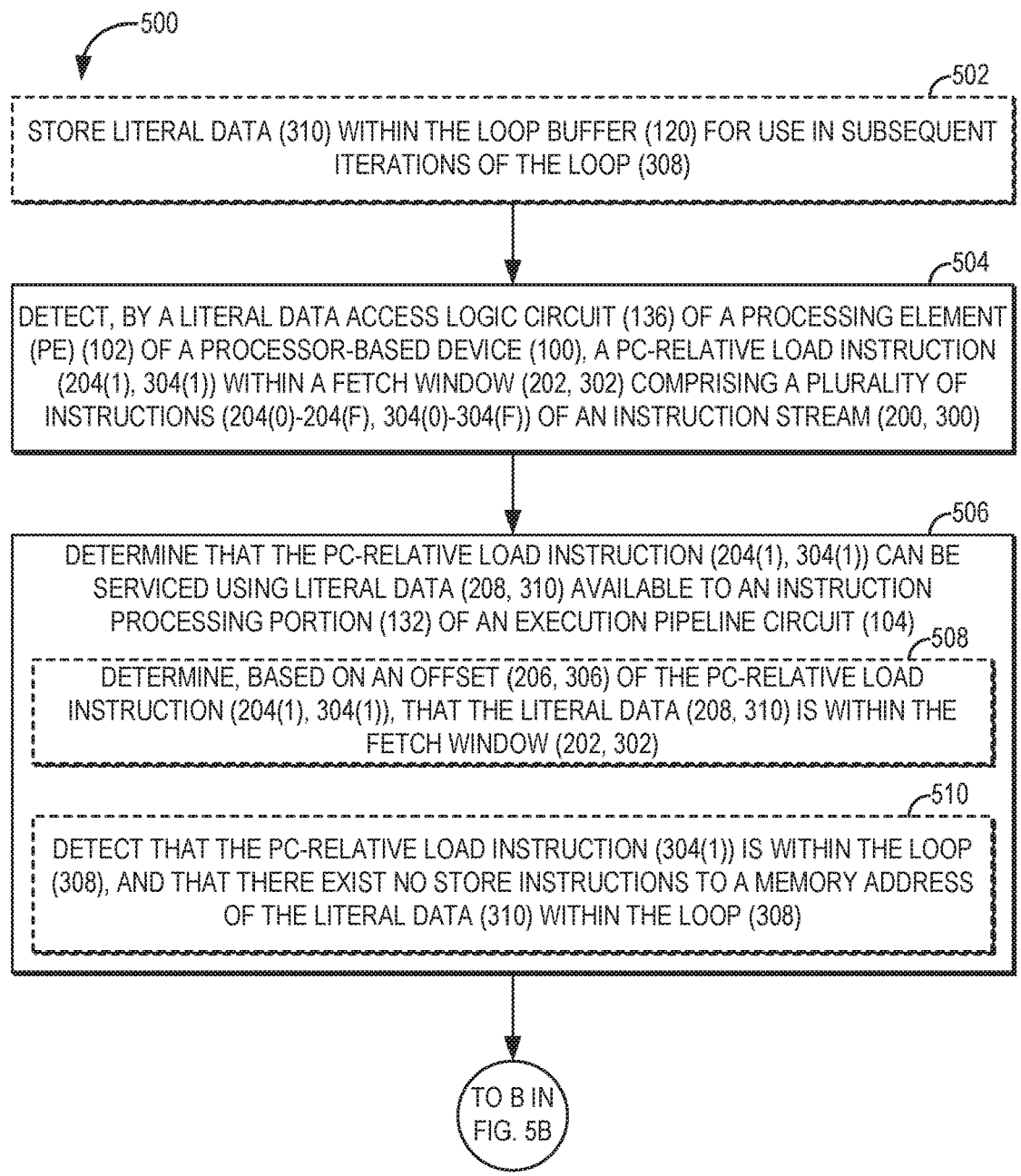
Figure 5B:
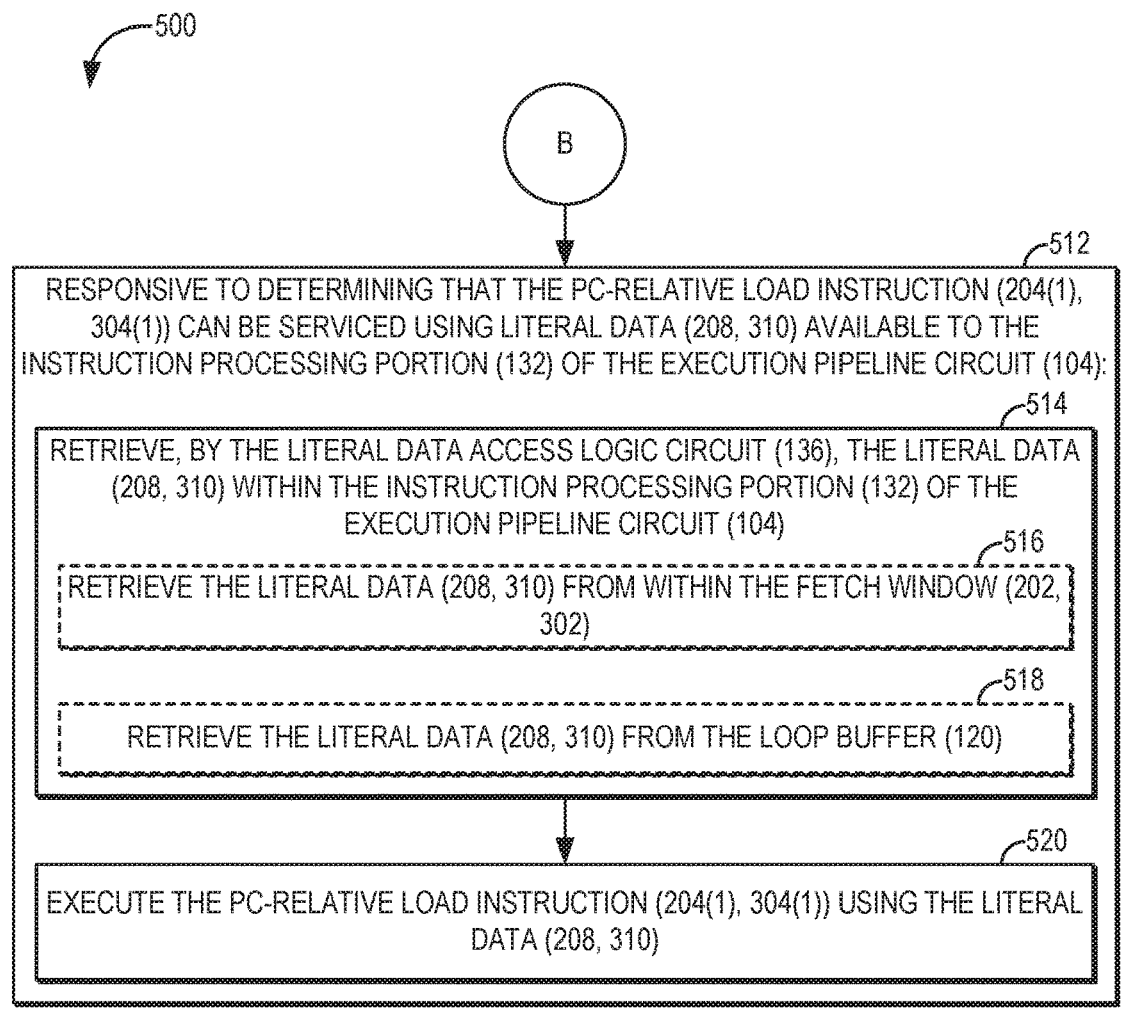
Figure 6A:
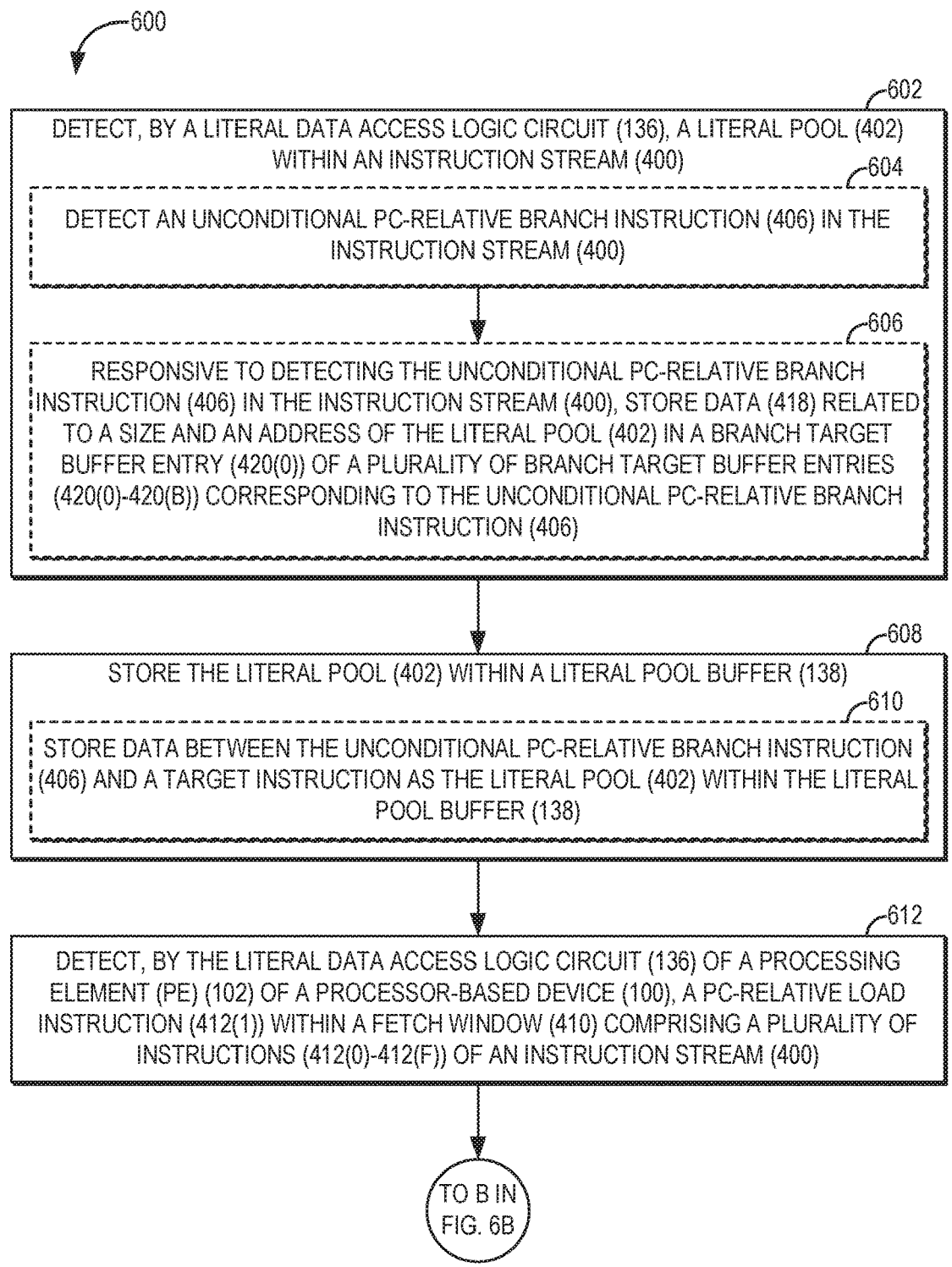
Figure 6B:
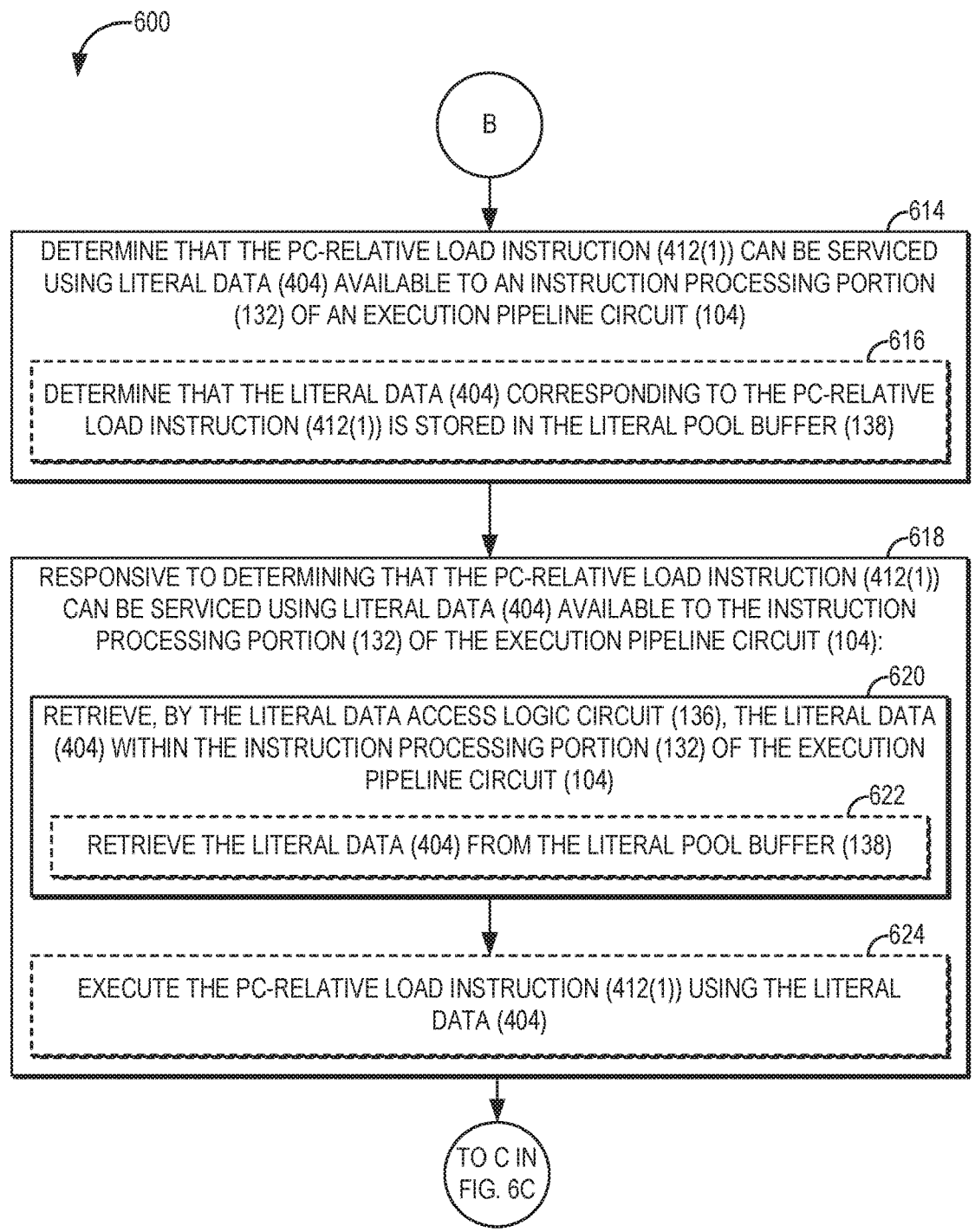
Figure 6C:
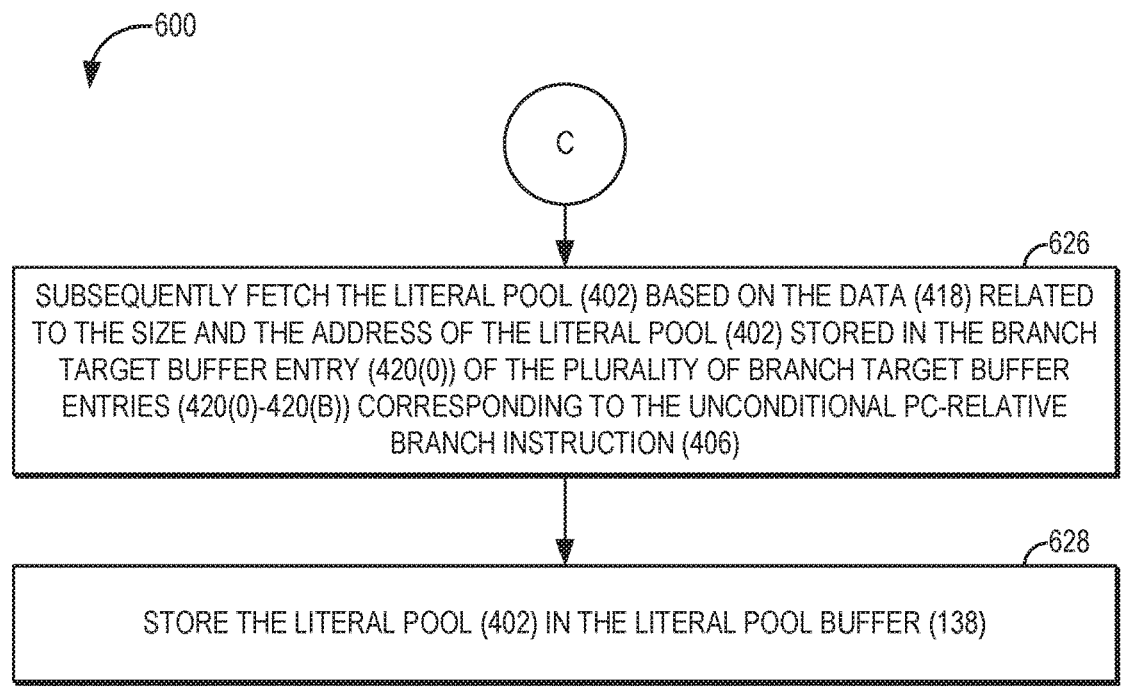
Figure 7:
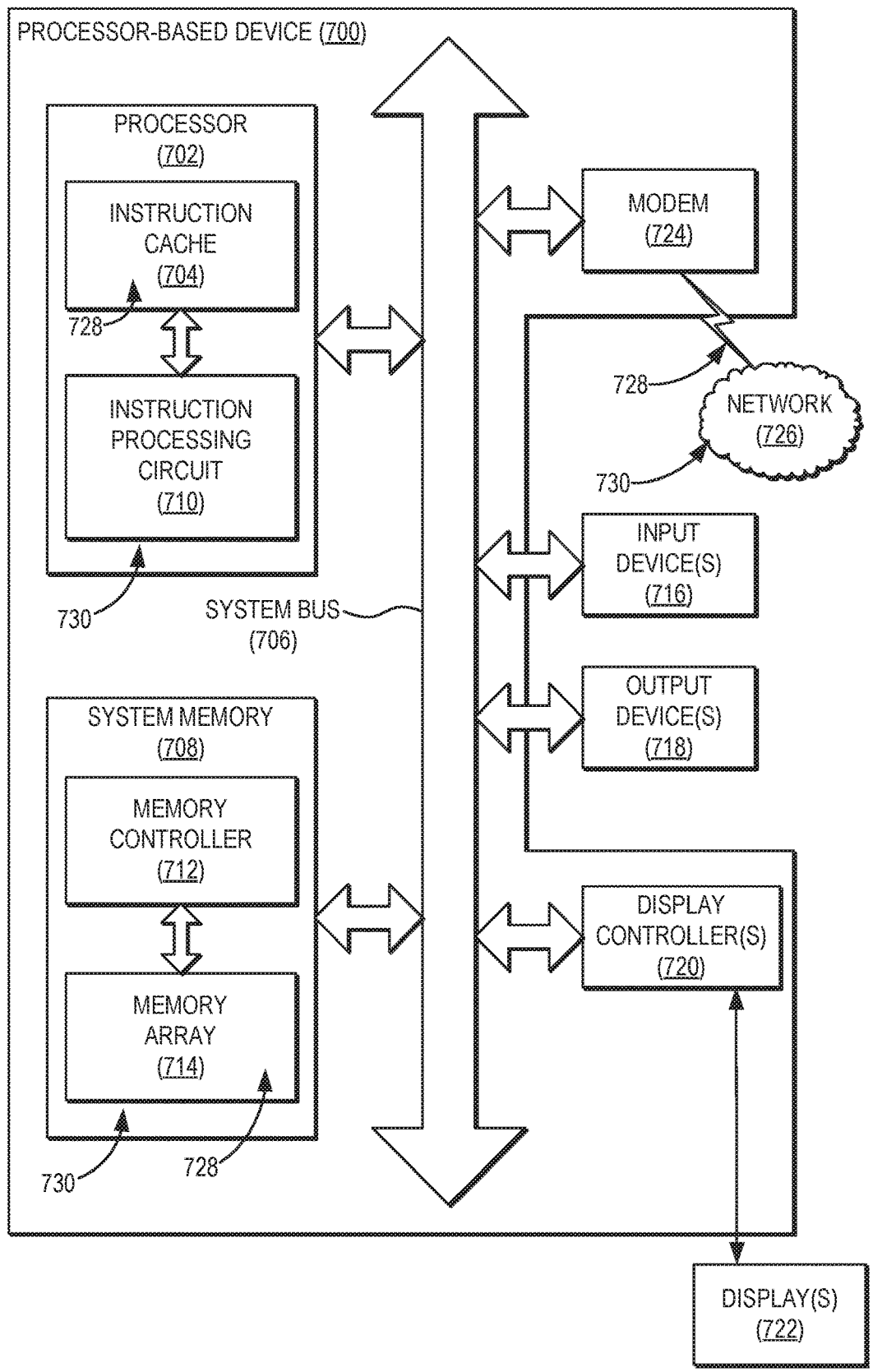

FIGS. 5A and 5B provide a flowchart illustrating exemplary operations of the processor-based device of FIG. 1 for delivering immediate values by using PC-relative load instructions to fetch literal data, according to some embodiments;

FIGS. 6A-6C provide a flowchart illustrating further exemplary operations of the processor-based device of FIG. 1 for detecting, storing, and using literal data in a literal pool buffer as immediate values for instructions dependent on a PC-relative load instruction, according to some embodiments; and FIG. 7 is a block diagram of an exemplary processor-based device, such as the processor-based device of FIG. 1, that is configured to deliver immediate values by using PC-relative load instructions to fetch literal data.

DETAILED DESCRIPTION

Exemplary embodiments disclosed herein include delivering immediate values by using program counter (PC)-relative load instructions to fetch literal data in processor-based devices. In one exemplary embodiment, a processing element (e.g., a processor core, as a non-limiting example) of a processor-based device provides an execution pipeline circuit that comprises an instruction processing portion and a data access portion. The instruction processing portion of the execution pipeline circuit includes circuits for fetching, decoding, and executing instructions in an instruction stream, as non-limiting examples, while the data access portion of the execution pipeline circuit includes circuits for, e.g., accessing data caches and performing writeback operations. Using a literal data access logic circuit, the PE detects a PC-relative load instruction within a fetch window that includes multiple fetched instructions. The PE determines that the PC-relative load instruction can be serviced using literal data that is available to the instruction processing portion of the execution pipeline circuit. For example, the literal data may be present within the fetch window containing the PC-relative load instruction, or may be included as part of a literal pool within the instruction stream that is retrieved and stored in a literal pool buffer. The PE then retrieves the literal data within the instruction processing portion of the execution pipeline circuit, and executes the PC-relative load instruction using the literal data. In this manner, the immediate value may be provided to the PC-relative load instruction from the instruction processing portion of the execution pipeline circuit without incurring the overhead and penalties associated with retrieving the immediate value in the later data access portion of the execution pipeline circuit.

In this regard, FIG. 1 illustrates an exemplary processor-based device 100 that provides a processing element (PE) 102 for processing executable instructions. The PE 102 in some embodiments may be one of a plurality of PEs of the processor-based device 100, and may comprise, e.g., an individual processor core comprising a logical execution unit and associated caches and functional units. The PE 102 of FIG. 1 includes an execution pipeline circuit 104 that is configured to perform execution of an instruction stream comprising computer-executable instructions. In the example of FIG. 1, the execution pipeline circuit 104 includes a fetch circuit 106 that is configured to fetch an instruction stream 108 of executable instructions from an instruction memory 110. The instruction memory 110 may be provided in or as part of a system memory (not shown) of the processor-based device 100, as a non-limiting example. An instruction cache 112 may also be provided in the PE 102 to cache instructions fetched from the instruction memory 110 to reduce latency in the fetch circuit 106. The fetch circuit 106 in the example of FIG. 1 is configured to provide instructions into one or more instruction pipelines $I_0$-$I_N$ to be pre-processed before the instructions reach an execution circuit 114 to be executed. The instruction pipelines $I_0$-$I_N$ are provided across different processing circuits (or "stages") of the execution pipeline circuit 104 to concurrently process fetched instructions to increase throughput prior to execution of the fetched instructions in the execution circuit 114.

A branch prediction circuit 116 is also provided in the execution pipeline circuit 104 of FIG. 1 to predict a branch target address for control flow instructions (e.g., conditional branch instructions, as a non-limiting example). The prediction of the branch target address by the branch prediction circuit 116 may be used by the fetch circuit 106 to determine the next instructions to fetch based on the predicted target address. The execution pipeline circuit 104 may also include a branch target buffer 118, which comprises a cache memory that may be accessed by the fetch circuit 106 and the branch prediction circuit 116. The branch target buffer 118 comprises a plurality of branch target buffer entries that are used to store branch instruction addresses of control flow instructions along with their corresponding branch target addresses, and may also store other metadata related to the instruction stream 108. If a control flow instruction is subsequently fetched again and is predicted to be taken by the branch prediction circuit 116, the branch target buffer 118 may be accessed to retrieve the associated branch target address, which may then be used as a next instruction fetch address by the fetch circuit 106.

The execution pipeline circuit 104 in some embodiments may also employ a loop buffer 120 to decrease latency for instructions that constitute a loop. In such embodiments, upon detecting that a plurality of fetched instructions represents a loop, the execution pipeline circuit 104 may store the fetched and decoded instructions and associated identifying information in the loop buffer 120. Subsequent iterations of the loop may then be executed by retrieving the instructions from the loop buffer 120 rather than re-fetching and re-decoding the instructions constituting the loop.

The execution pipeline circuit 104 additionally includes a decode circuit 122 that is configured to decode instructions fetched by the fetch circuit 106 into decoded instructions to determine the instruction type and actions required, and further to determine into which instruction pipeline $I_0$-$I_N$ the decoded instructions should be placed. The decoded instructions are then placed into one or more of the instruction pipelines $I_0$-$I_N$, and are next provided to a register access circuit 124. The register access circuit 124 is configured to access physical registers (not shown) to retrieve produced values from previous executed instructions from the execution circuit 114. The register access circuit 124 is also configured to provide the retrieved produced value from an executed instruction as a source register operand of a decoded instruction to be executed. The execution pipeline circuit 104 further includes a memory access circuit 126 which is configured to access data in a data cache 128 or in a data memory 129 as a result of execution of instructions by the execution circuit 114. Finally, the execution pipeline circuit 104 includes a writeback circuit 130 which is configured to write the results generated by executed instructions back into the registers.

As seen in FIG. 1, the constituent elements of the execution pipeline circuit 104 may be generally classified into an instruction processing portion 132 and a data access portion 134. The instruction processing portion 132 comprises the circuits or stages for fetching, decoding, and executing instructions. Thus, in the example of FIG. 1, the instruction processing portion 132 includes the fetch circuit 106, the decode circuit 122, the register access circuit 124, and the execution circuit 114. In contrast, the data access portion 134 comprises the circuits or stages for accessing the data cache 128 and the data memory 129, and thus includes the memory access circuit 126. It is to be understood that execution of instructions that require accesses to the data cache 128 or to the data memory 129 is not complete until the instructions reach the later data access portion 134 of the execution pipeline circuit 104. Consequently, such instructions may take longer to complete than instructions whose execution can be completed earlier in the instruction processing portion 132 of the execution pipeline circuit 104.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the PE 102 may further include one or more functional units, instruction caches, unified caches, memory controllers, interconnect buses, and/or additional memory devices, caches, and/or controller circuits, which are omitted from FIG. 1 for the sake of clarity. Additionally, the execution pipeline circuit 104 of FIG. 1 may include more or fewer circuits or stages than illustrated in FIG. 1.

As noted above, processor-based devices such as the processor-based device 100 of FIG. 1 may face challenges in generating immediate values that are large relative to the instruction size of the processor-based device 100. Under one approach, large immediate values may be generated using multiple instructions, but this approach requires multiple fetch, decode, and/or execution lanes in the processor-based device 100, and may also result in decreased code density. Alternatively, the processor-based device 100 may be based on a variable length instruction set that provides larger instruction encodings, but that also results in increased fetch complexity and increased fetch bandwidth requirements. Finally, literal pools may be provided and accessed via PC-relative load instructions, but this technique requires accessing the literal pool in the later data access portion 134 of the execution pipeline circuit 104, resulting in increased latency and resource hazard risks.

In this regard, the processor-based device 100 of FIG. 1 provides a literal data access logic circuit 136 that is configured to deliver immediate values by using PC-relative load instructions to fetch literal data. It is to be understood that, although the literal data access logic circuit 136 is illustrated as a standalone element of the PE 102, the literal data access logic circuit 136 may be provided as part of the execution pipeline circuit 104 and/or the constituent element thereof. The literal data access logic circuit 136 is configured to detect a PC-relative load instruction within a fetch window in the instruction stream 108, and determine that the PC-relative load instruction can be serviced using literal data that is available to the instruction processing portion 132 of the execution pipeline circuit 104. For example, according to some embodiments, the literal data access logic circuit 136 may determine, based on an offset of the PC-relative load instruction, that the literal data is available within the fetch window, or that the PC-relative load instruction is within a loop and the literal data for the PC-relative load instruction has been stored in the loop buffer 120. In some embodiments, the literal data access logic circuit 136 may detect that the instruction stream 108 contains a literal pool that has been stored in a literal pool buffer 138. The literal data access logic circuit 136 then retrieves the literal data (e.g., from the fetch window, the loop buffer 120, or the literal pool buffer 138, as non-limiting examples), and the execution pipeline circuit 104 executes the PC-relative load instruction using the literal data. In this manner, the PC-relative load instructions can be executed earlier within the execution pipeline circuit 104 while avoiding the use of data cache resources.

Figure 2:
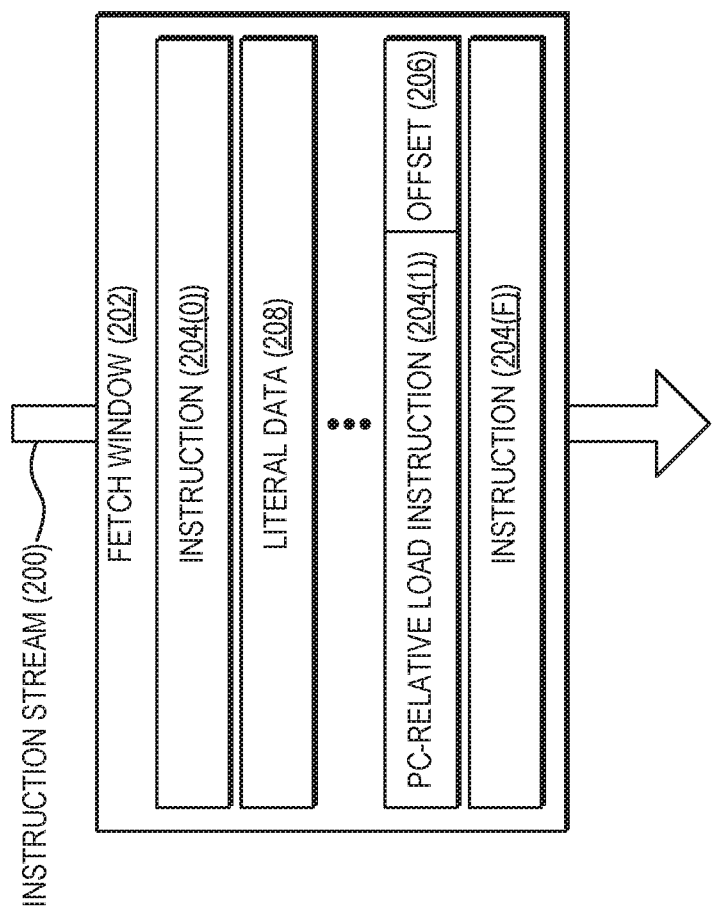
FIG. 2 is a block diagram illustrating a fetch window from which literal data may be retrieved by a PC-relative load instruction for use as an immediate value by a dependent instruction, according to one embodiment.
Figure 3:
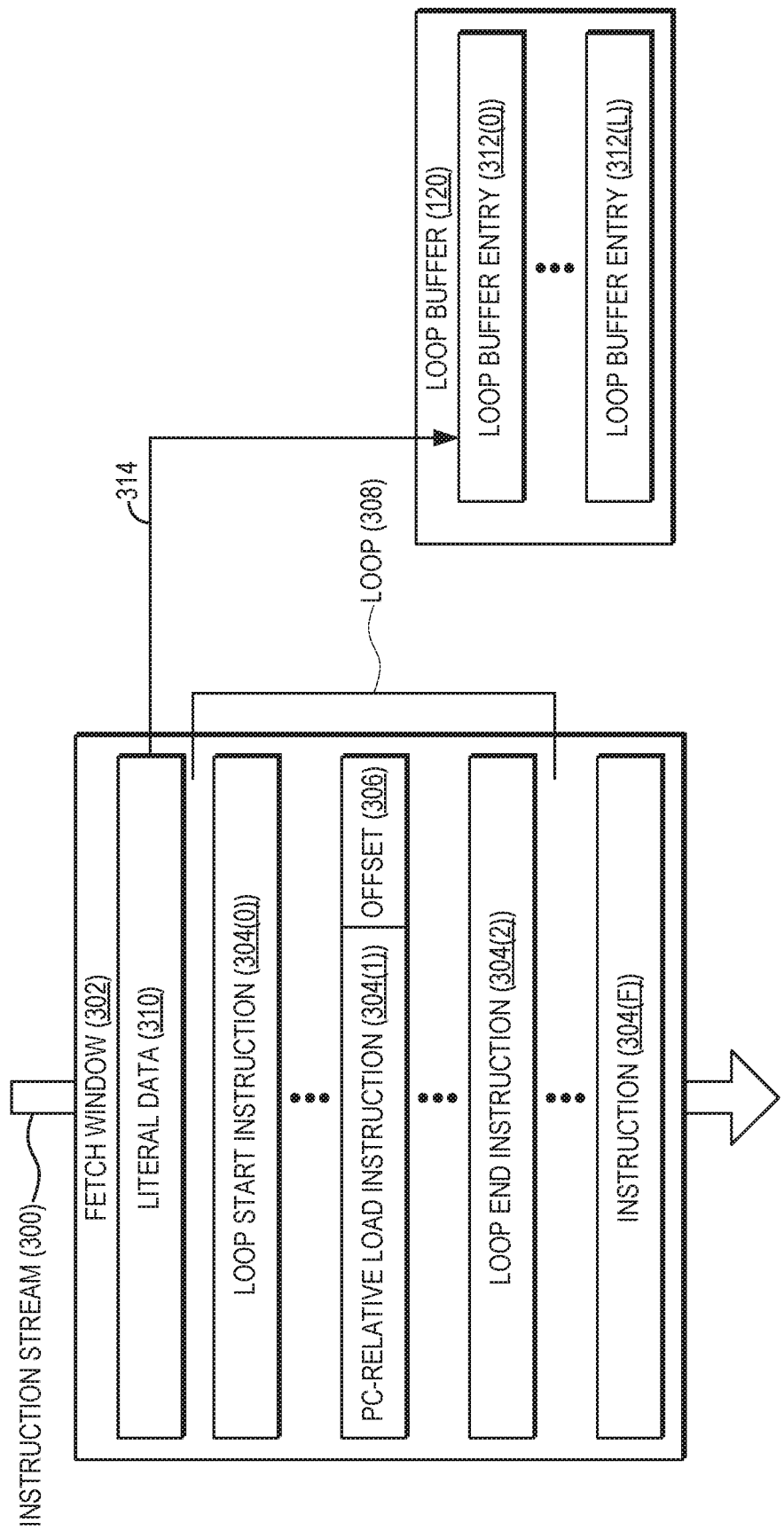
FIG. 3 is a block diagram illustrating a fetch window containing a PC-relative load instruction within a loop, and the use of a loop buffer as a temporary store for literal data, according to one embodiment.
Figure 4:
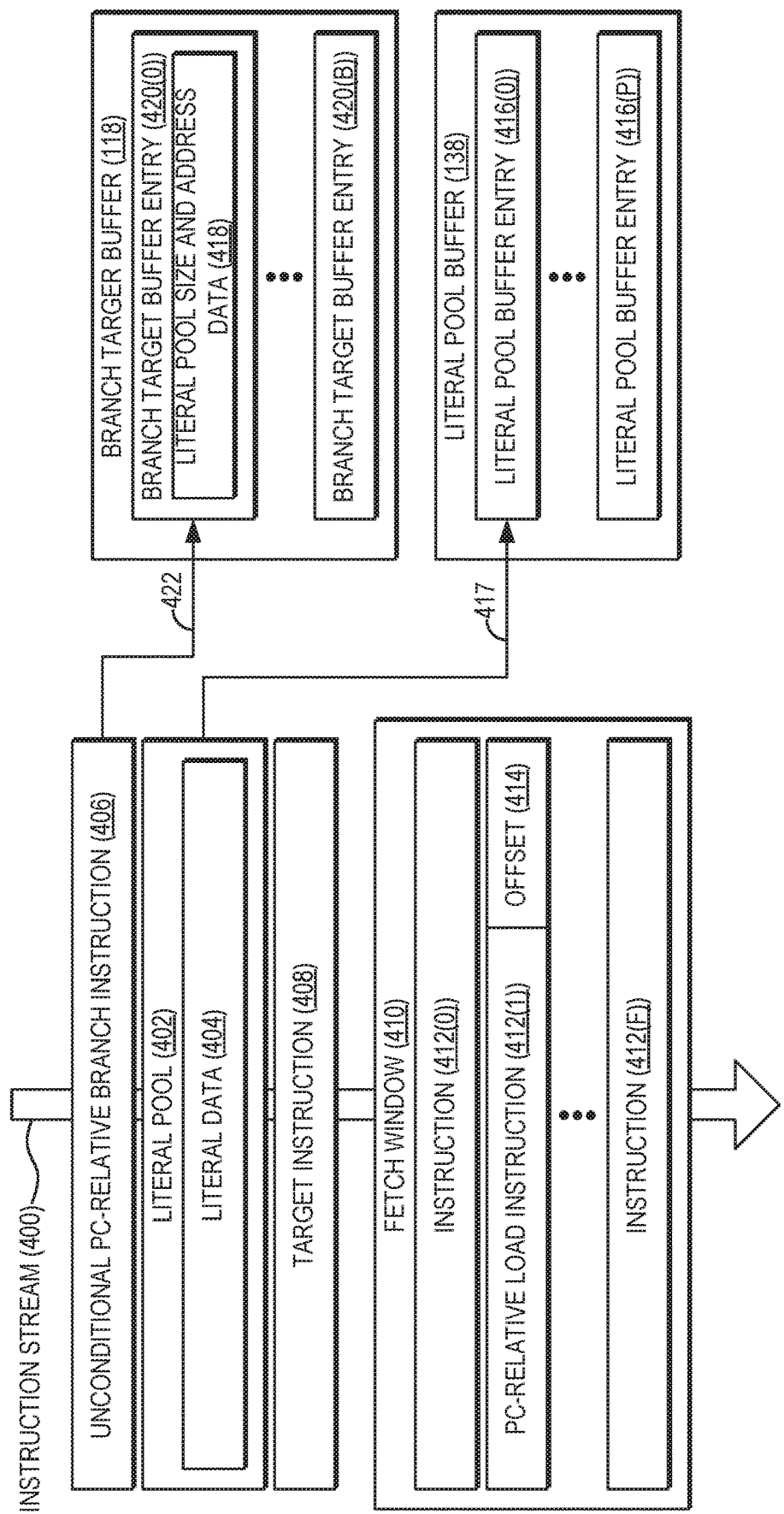
FIG. 4 is a block diagram illustrating the use of a literal pool buffer to store a literal pool detected in an instruction stream, and the additional use of a branch target buffer to store data associated with the detected literal pool, according to some embodiments.

FIGS. 2-4 are provided to illustrate different mechanisms for detecting and retrieving literal data that may be used as immediate values for instructions dependent on PC-relative load instructions. FIG. 2 illustrates how literal data may be detected within a fetch window that also contains a PC-relative load instruction, while FIG. 3 illustrates the use of the loop buffer 120 of FIG. 1 for storing previously detected literal data. FIG. 4 illustrates detection and storage of a literal pool in the literal pool buffer 138 of FIG. 1, and the use of the branch target buffer 118 to subsequently retrieve the literal pool from the literal pool buffer 138. Each of FIGS. 2-4 is discussed in turn below.

In FIG. 2, an instruction stream 200, corresponding to the instruction stream 108 of FIG. 1, includes a fetch window 202 containing a plurality of instructions 204(0)-204(F). It is to be understood that the fetch window 202 represents a block of instructions that may be fetched at the same time by the fetch circuit 106 of FIG. 1, and that the number of instructions F within the fetch window 202 may vary based on implementation. In the example of FIG. 2, the instructions 204(0)-204(F) include a PC-relative load instruction 204(1) that comprises an offset 206. The offset 206 represents a distance between a PC of the PC-relative load instruction 204(1) and literal data 208 that is to be loaded by the PC-relative load instruction 204(1) for subsequent use as an immediate value. Thus, the address of the literal data 208 may be determined as the sum of the PC of the PC-relative load instruction 204(1) and the offset 206. It is to be understood that, while the literal data 208 in FIG. 2 is shown preceding the PC-relative load instruction 204(1) in the fetch window 202, the literal data 208 in some embodiments may appear after the PC-relative load instruction 204(1) in the fetch window 202. In the former case, the offset 206 may have a negative value, while in the latter case the offset 206 may have a positive value.

In embodiments according to FIG. 2, the literal data access logic circuit 136 of FIG. 1 may be configured to determine that the PC-relative load instruction 204(1) can be serviced using the literal data 208 available to the instruction processing portion 132 of the execution pipeline circuit 104 by determining, based on the offset 206, that the literal data 208 is within the fetch window 202. Because the literal data 208 was fetched as part of the fetch window 202, the literal data access logic circuit 136 can retrieve the literal data 208 from within the fetch window 202, and can deliver the literal data 208 for use in executing the PC-relative load instruction 204(1).

FIG. 3 illustrates a scenario similar to that of FIG. 2, except in this example the loop buffer 120 of FIG. 1 is used to store and retrieve literal data. Accordingly, in FIG. 3, an instruction stream 300, corresponding to the instruction stream 108 of FIG. 1, includes a fetch window 302 comprising a plurality of instructions 304(0)-304(F). The plurality of instructions 304(0)-304(F) includes a PC-relative load instruction 304(1), along with its offset 306. The PC-relative load instruction 304(1) lies within a loop 308 that is bounded by the loop start instruction 304(0) and the loop end instruction 304(2). As a non-limiting example, the loop end instruction 304(2) may comprise a conditional branch instruction that specifies the loop start instruction 304(0) as its target instruction. In the example of FIG. 3, the fetch window 302 further includes literal data 310. However, it is to be understood that the principle of operation described with respect to FIG. 3 applies to examples in which the literal data 310 lies outside the fetch window 302. It is to be further understood that, while the literal data 310 in FIG. 3 is shown preceding the PC-relative load instruction 304(1) in the fetch window 302, the literal data 310 in some embodiments may appear after the PC-relative load instruction 304(1) in the fetch window 302.

In exemplary operation, embodiments according to FIG. 3 may provide that the literal data access logic circuit 136, upon a first iteration of the loop 308, causes the literal data 310, located using the offset 306, to be accessed and written to a loop buffer entry of a plurality of loop buffer entries 312(0)-312(L) of the loop buffer 120 (e.g., the loop buffer entry 312(0), as indicated by arrow 314). The literal data 310 thus may be stored along with other instructions and data comprising the loop 308 within the loop buffer 120. For subsequent iterations of the loop 308, the literal data access logic circuit 136 determines that the PC-relative load instruction 304(1) can be serviced using the literal data 310 by detecting that the PC-relative load instruction 304(1) is within the loop 308, and further that there exist no store instructions to a memory address of the literal data 310 within the loop 308. The literal data access logic circuit 136 then retrieves the literal data 310 from the loop buffer 120 for use as the immediate value for the PC-relative load instruction 304(1).

To illustrate a scenario in which the literal pool buffer 138 of FIG. 1 may be used by the literal data access logic circuit 136 for storing a literal pool and subsequently retrieving literal data, FIG. 4 is provided. As seen in FIG. 4, an instruction stream 400, corresponding to the instruction stream 108 of FIG. 1, includes a literal pool 402 comprising literal data 404. The literal pool 402 may be bounded by, e.g., an unconditional PC-relative branch instruction 406 that branches over the literal pool 402 to a target instruction 408. The instruction stream 400 further includes a fetch window 410 containing a plurality of instructions 412(0)-412(F). The plurality of instructions 412(0)-412(F) includes a PC-relative load instruction 412(1) and its associated offset 414, which points to the literal data 404 as the source of an immediate value for the PC-relative load instruction 412(1). It is to be understood that, while the literal pool 402 is illustrated in FIG. 4 as preceding the fetch window 410 in the instruction stream 400, in some embodiments the literal pool 402 may follow the fetch window 410 in the instruction stream 400, or may overlap the beginning or the end of the fetch window 410.

In embodiments according to FIG. 4, the literal data access logic circuit 136 may first detect the literal pool 402 within the instruction stream 400 (e.g., by detecting the unconditional PC-relative branch instruction 406 that marks the beginning of the literal pool 402). The literal data access logic circuit 136 then retrieves and stores the literal pool 402 (i.e., all data between the unconditional PC-relative branch instruction 406 and the target instruction 408), including the literal data 404, in a literal pool buffer entry of a plurality of literal pool buffer entries 416(0)-416(P) of the literal pool buffer 138 (e.g., the literal pool buffer entry 416(0), as indicated by arrow 417). Along with the literal pool 402, the literal pool buffer entry 416(0) may also store data regarding a size and a memory address of the literal pool 402.

In the example of FIG. 4, the literal data access logic circuit 136, after detecting the literal pool 402, further adds literal pool size and address data 418 to a branch target buffer entry of a plurality of branch target buffer entries 420(0)-420(B) of the branch target buffer (e.g., the branch target buffer entry 420(0), as indicated by arrow 422). The branch target buffer entry 420(0) is associated with the unconditional PC-relative branch instruction 406. In this manner, the literal data access logic circuit 136 can subsequently fetch the literal pool 402 based on the literal pool size and address data 418 stored in the branch target buffer entry 420(0) corresponding to the unconditional PC-relative branch instruction 406, and store the literal pool 402 in the literal pool buffer 138.

The literal data access logic circuit 136 subsequently determines that the PC-relative load instruction 412(1) can be serviced using the literal data 404 by determining that the literal data 404 corresponding to the PC-relative load instruction 412(1) is stored in the literal pool buffer 138 (e.g., based on the offset 414 and the stored data regarding the memory address and the size of the literal pool 402 stored in the literal pool buffer entry 416(0)). The literal data access logic circuit 136 then retrieves the literal data 404 from the literal pool buffer 138 for use in executing the PC-relative load instruction 412(1).

In all of the embodiments discussed above, it is to be understood that, while well-formed software likely would not use PC-relative load instructions in a way that generates data aborts, it still may be necessary to perform load checks data checks that would normally be performed within the data access portion 134 of the execution pipeline circuit 104) within the instruction processing portion 132 of the execution pipeline circuit 104. Additionally, any data delivered from the instruction processing portion 132 of the execution pipeline circuit 104 would need to be considered speculative until the instructions ahead of each PC-relative load instruction are committed. In some embodiments, checking logic conventionally performed in the data access portion 134, such as alignment and access permission checks, may be duplicated in the instruction processing portion 132 to reduce the cycles needed for each PC-relative load instruction to be committed and to remove the load completely from data-side resources. Note that requirements related to ordering, coherence, and speculation avoidance may require that some PC-relative load instructions still commit from the data access portion 134 of the execution pipeline circuit 104.

To illustrate exemplary operations for delivering immediate values by using PC-relative load instructions to fetch literal data in processor-based devices according to some embodiments, FIGS. 5A and 5B provide a flowchart 500. For the sake of clarity, elements of FIGS. 1-3 are referenced in describing FIGS. 5A and 5B. In some embodiments, operations in FIG. 5A begin with the literal data access logic circuit 136 storing literal data (such as the literal data 310) within the loop buffer 120 for use in subsequent iterations of the loop 308 (block 502). The literal data access logic circuit 136 of the PE 102 of the processor-based device 100 detects the PC-relative load instruction (e.g., the PC-relative load instruction 204(1) or 304(1)) within the fetch window 202, 302 comprising the plurality of instructions 204(0)-204(F), 304(0)-304(F) of the instruction stream 200, 300 (block 504).

The literal data access logic circuit 136 next determines that the PC-relative load instruction 204(1), 304(1) can be serviced using literal data 208, 310 available to the instruction processing portion 132 of the execution pipeline circuit 104 (block 506). In some embodiments, the operations of block 506 for determining that the PC-relative load instruction 204(1), 304(1) can be serviced using literal data 208, 310 available to the instruction processing portion 132 of the execution pipeline circuit 104 may comprise determining, based on the offset 206, 306 of the PC-relative load instruction 204(1), 304(1), that the literal data 208, 310 is within the fetch window 202, 302 (block 508). Some embodiments may provide that the operations of block 506 for determining that the PC-relative load instruction 204(1), 304(1) can be serviced using literal data 208, 310 available to the instruction processing portion 132 of the execution pipeline circuit 104 may comprise detecting that the PC-relative load instruction 304(1) is within the loop 308, and that there exist no store instructions to a memory address of the literal data 310 within the loop 308 (block 510). Operations then continue at block 512 of FIG. 5B.

Referring now to FIG. 5B, responsive to determining that the PC-relative load instruction 204(1), 304(1) can be serviced using the literal data 208, 310 available to the instruction processing portion 132 of the execution pipeline circuit 104, the PE 102 performs a sequence of operations, as indicated by block 512. The literal data access logic circuit 136 retrieves the literal data 208, 310 within the instruction processing portion 132 of the execution pipeline circuit 104 (block 514). According to some embodiments, the operations of block 514 for retrieving the literal data 208, 310 within the instruction processing portion 132 of the execution pipeline circuit 104 may comprise retrieving the literal data 208, 310 from within the fetch window 202, 302 (block 516). In some embodiments, the operations of block 514 for retrieving the literal data 208, 310 within the instruction processing portion 132 of the execution pipeline circuit 104 may comprise retrieving the literal data 310 from the loop buffer 120 (block 518). The execution pipeline circuit 104 of the PE 102 then executes the PC-relative load instruction 204(1), 304(1) using the literal data 208, 310 (block 520).

FIGS. 6A-6C provide a flowchart 600 illustrating further exemplary operations of the processor-based device 100 of FIG. 1 for detecting, storing, and using literal data in the literal pool buffer 138 for use as immediate values for instructions dependent on a PC-relative load instruction, according to some embodiments. Elements of FIGS. 1 and 4 are referenced in describing FIGS. 6A-6C for the sake of clarity. In FIG. 6A, operations begin with the literal data access logic circuit 136 detecting the literal pool 402 within the instruction stream 400 (block 602). Some embodiments may provide that the operations of block 602 for detecting the literal pool 402 within the instruction stream 400 may first comprise detecting the unconditional PC-relative branch instruction 406 in the instruction stream 400 (block 604). Responsive to detecting the unconditional PC-relative branch instruction 406 in the instruction stream 400, the literal data access logic circuit 136 may then store data 418 related to a size and an address of the literal pool 402 in the branch target buffer entry 420(0) of the plurality of branch target buffer entries 420(0)-420(B) corresponding to the unconditional PC-relative branch instruction 406 (block 606).

The literal data access logic circuit 136 next stores the literal pool 402 within the literal pool buffer 138 (block 608). In some embodiments, the operations of block 608 for storing the literal pool 402 within the literal pool buffer 138 may comprise storing the data between the unconditional PC-relative branch instruction 406 and the target instruction 408 as the literal pool 402 within the literal pool buffer 138 (block 610). The literal data access logic circuit 136 then detects the PC-relative load instruction 412(1) within the fetch window 410 comprising the plurality of instructions 412(0)-412(F) of the instruction stream 400 (block 612). Operations then continue at block 614 of FIG. 6B.

Turning now to FIG. 6B, the literal data access logic circuit 136 determines that the PC-relative load instruction 412(1) can be serviced using the literal data 404 available to the instruction processing portion 132 of the execution pipeline circuit 104 (block 614). Some embodiments may provide that the operations of block 614 for determining that the PC-relative load instruction 412(1) can be serviced using the literal data 404 available to the instruction processing portion 132 of the execution pipeline circuit 104 comprise determining that the literal data 404 corresponding to the PC-relative load instruction 412(1) is stored in the literal pool buffer 138 (block 616). Responsive to determining that the PC-relative load instruction 412(1) can be serviced using the literal data 404 available to the instruction processing portion 132 of the execution pipeline circuit 104, the PE 102 performs a sequence of operations, as indicated by block 618. The literal data access logic circuit 136 retrieves the literal data 404 within the instruction processing portion 132 of the execution pipeline circuit 104 (block 620). According to some embodiments, the operations of block 620 for retrieving the literal data 404 within the instruction processing portion 132 of the execution pipeline circuit 104 may comprise retrieving the literal data 404 from the literal pool buffer 138 (block 622). The execution pipeline circuit 104 of the PE 102 then executes the PC-relative load instruction 412(1) using the literal data 404 (block 624). Operations then continue at block 626 of FIG. 6C.

Referring now to FIG. 6C, the literal data access logic circuit 136 in some embodiments subsequently fetches the literal pool 402 based on the data 418 related to the size and the address of the literal pool 402 stored in the branch target buffer entry 420(0) of the plurality of branch target buffer entries 420(0)-420(B) corresponding to the unconditional PC-relative branch instruction 406 (block 626). The literal data access logic circuit 136 then stores the literal pool 402 in the literal pool buffer 138 (block 628).

FIG. 7 is a block diagram of an exemplary processor-based device 700, such as the processor-based device 100 of FIG. 1, that provides delivery of immediate values for program counter (PC)-relative load instructions using fetched literal data. The processor-based device 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 700 includes a processor 702. The processor 702 represents one or more general-purpose processing circuits, such as a microprocessor, central processing unit, or the like, and may correspond to the PE 102 of FIG. 1. The processor 702 is configured to execute processing logic in instructions for performing the operations and steps discussed herein. In this example, the processor 702 includes an instruction cache 704 for temporary, fast access memory storage of instructions and an instruction processing circuit 710. Fetched or prefetched instructions from a memory, such as from a system memory 708 over a system bus 706, are stored in the instruction cache 704. The instruction processing circuit 710 is configured to process instructions fetched into the instruction cache 704 and process the instructions for execution.

The processor 702 and the system memory 708 are coupled to the system bus 706 and can intercouple peripheral devices included in the processor-based device 700. As is well known, the processor 702 communicates with these other devices by exchanging address, control, and data information over the system bus 706. For example, the processor 702 can communicate bus transaction requests to a memory controller 712 in the system memory 708 as an example of a peripheral device. Although not illustrated in FIG. 7, multiple system buses 706 could be provided, wherein each system bus constitutes a different fabric. In this example, the memory controller 712 is configured to provide memory access requests to a memory array 714 in the system memory 708. The memory array 714 is comprised of an array of storage bit cells for storing data. The system memory 708 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 706. As illustrated in FIG. 7, these devices can include the system memory 708, one or more input device(s) 716, one or more output device(s) 718, a modem 724, and one or more display controller(s) 720, as examples. The input device(s) 716 can include any type of input device, including, but not limited to, input keys, switches, voice processors, etc. The output device(s) 718 can include any type of output device, including, but not limited to, audio, video, other visual indicators, etc. The modem 724 can be any device configured to allow exchange of data to and from a network 726. The network 726 can be any type of network, including, but not limited to, a wired or wireless network, a private or public network, a local area network (LAN), a wireless local area network (WLAN), a wide area network (WAN), a BLUETOOTH™ network, and the Internet. The modem 724 can be configured to support any type of communications protocol desired. The processor 702 may also be configured to access the display controller(s) 720 over the system bus 706 to control information sent to one or more display(s) 722. The display(s) 722 can include any type of display, including, but not limited to, a cathode ray tube (CRT), a liquid crystal display (LCD), a plasma display, etc.

The processor-based device 700 in FIG. 7 may include a set of instructions 728 that may be executed by the processor 702 for any application desired according to the instructions. The instructions 728 may be stored in the system memory 708, processor 702, and/or instruction cache 704 as examples of non-transitory computer-readable medium 730. The instructions 728 may also reside, completely or at least partially, within the system memory 708 and/or within the processor 702 during their execution. The instructions 728 may further be transmitted or received over the network 726 via the modem 724, such that the network 726 includes the computer-readable medium 730.

While the computer-readable medium 730 is shown in an exemplary embodiment to be a single medium, the term "computer-readable medium" should be taken to include a single medium or multiple media (e.g., a centralized or distributed database, and/or associated caches and servers) that store the one or more sets of instructions 728. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals; bits; symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
a processing element (PE) comprising:
an execution pipeline circuit comprising an instruction processing portion and a data access portion;
a literal pool buffer;
a literal data access logic circuit; and
a branch target buffer comprising a plurality of branch target buffer entries;
the PE configured to:
detect, by the literal data access logic circuit, a literal pool within an instruction stream by being configured to:
detect an unconditional PC-relative branch instruction in the instruction stream; and
responsive to detecting the unconditional PC-relative branch instruction in the instruction stream, store data related to a size and an address of the literal pool in a branch target buffer entry of the plurality of branch target buffer entries corresponding to the unconditional PC-relative branch instruction;
fetch the literal pool based on the data related to the size and the address of the literal pool stored in the branch target buffer entry of the plurality of branch target buffer entries corresponding to the unconditional PC-relative branch instruction;
store the literal pool within the literal pool buffer by being configured to store data between the unconditional PC-relative branch instruction and a target instruction as the literal pool within the literal pool buffer;
detect, by the literal data access logic circuit, a program counter (PC)-relative load instruction within a fetch window comprising a plurality of instructions of the instruction stream;
determine that literal data corresponding to the PC-relative load instruction is stored in the literal pool buffer; and
responsive to determining that the literal data corresponding to the PC-relative load instruction is stored in the literal pool buffer:
retrieve, within the instruction processing portion of the execution pipeline circuit by the literal data access logic circuit, the literal data from the literal pool buffer; and
execute the PC-relative load instruction using the literal data as an immediate value to be loaded.

2. The processor-based device of claim 1, wherein:
the PC-relative load instruction comprises an offset; and
the PE is configured to:
determine that the PC-relative load instruction can be serviced using the literal data available to the instruction processing portion of the execution pipeline circuit by being configured to determine, based on the offset, that the literal data is within the fetch window; and
retrieve the literal data within the instruction processing portion of the execution pipeline circuit by being configured to retrieve the literal data from within the fetch window.

3. The processor-based device of claim 1, wherein the PE is configured to determine that the PC-relative load instruction can be serviced using the literal data available to the instruction processing portion of the execution pipeline circuit at a specified decision point within the execution pipeline circuit.

4. The processor-based device of claim 1, wherein:
the PE further comprises a loop buffer;
the PE is configured to:
determine that the PC-relative load instruction can be serviced using the literal data available to the instruction processing portion of the execution pipeline circuit by being configured to detect that the PC-relative load instruction is within a loop, and that there exist no store instructions to a memory address of the literal data within the loop; and
retrieve the literal data within the instruction processing portion of the execution pipeline circuit by being configured to retrieve the literal data from the loop buffer;
the PE is further configured to store the literal data within the loop buffer for use in subsequent iterations of the loop.

5. A method for delivering immediate values by using program counter (PC)-relative load instructions to fetch literal data, comprising:
detecting, by a literal data access logic circuit of a processing element (PE) of a processor-based device, a literal pool within an instruction stream by:
detecting an unconditional PC-relative branch instruction in the instruction stream; and
responsive to detecting the unconditional PC-relative branch instruction in the instruction stream, storing data related to a size and an address of the literal pool in a branch target buffer entry of a plurality of branch target buffer entries of a branch target buffer, the branch target buffer entry corresponding to the unconditional PC-relative branch instruction;
fetching the literal pool based on the data related to the size and the address of the literal pool stored in the branch target buffer entry of the plurality of branch target buffer entries corresponding to the unconditional PC-relative branch instruction;
storing the literal pool within a literal pool buffer of the PE by being configured to store data between the unconditional PC-relative branch instruction and a target instruction as the literal pool within the literal pool buffer;
detecting, by the literal data access logic circuit, a PC-relative load instruction within a fetch window comprising a plurality of instructions of the instruction stream;
determining that the literal data corresponding to the PC-relative load instruction is stored in the literal pool buffer; and
responsive to determining that the literal data corresponding to the PC-relative load instruction is stored in the literal pool buffer:
retrieving, within the instruction processing portion of the execution pipeline circuit by the literal data access logic circuit, the literal data from the literal pool buffer; and
executing the PC-relative load instruction using the literal data as an immediate value to be loaded.

6. The method of claim 5, wherein:
the PC-relative load instruction comprises an offset;
determining that the PC-relative load instruction can be serviced using the literal data available to the instruction processing portion of the execution pipeline circuit comprises determining, based on the offset, that the literal data is within the fetch window; and
retrieving the literal data within the instruction processing portion of the execution pipeline circuit comprises retrieving the literal data from within the fetch window.

7. The method of claim 5, wherein determining that the PC-relative load instruction can be serviced using the literal data available to the instruction processing portion of the execution pipeline circuit comprising determining at a specified decision point within the execution pipeline circuit.

8. The method of claim 5, wherein:
the PE further comprises a loop buffer;
determining that the PC-relative load instruction can be serviced using the literal data available to the instruction processing portion of the execution pipeline circuit comprises detecting that the PC-relative load instruction is within a loop, and that there exist no store instructions to a memory address of the literal data within the loop;
retrieving the literal data within the instruction processing portion of the execution pipeline circuit comprises retrieving the literal data from the loop buffer; and
the method further comprises storing the literal data within the loop buffer for use in subsequent iterations of the loop.

9. A non-transitory computer-readable medium having stored thereon computer-executable instructions which, when executed by a processor, cause the processor to:
detect a literal pool within an instruction stream by causing the processor to:
detect an unconditional PC-relative branch instruction in the instruction stream; and
responsive to detecting the unconditional PC-relative branch instruction in the instruction stream, store data related to a size and an address of the literal pool in a branch target buffer entry of a plurality of branch target buffer entries of a branch target buffer, the branch target buffer entry corresponding to the unconditional PC-relative branch instruction;
fetch the literal pool based on the data related to the size and the address of the literal pool stored in the branch target buffer entry of the plurality of branch target buffer entries corresponding to the unconditional PC-relative branch instruction;
store the literal pool within a literal pool buffer by causing the processor to store data between the unconditional PC-relative branch instruction and a target instruction as the literal pool within the literal pool buffer;
detect a program counter (PC)-relative load instruction within a fetch window comprising a plurality of instructions of the instruction stream;
determine that literal data corresponding to the PC-relative load instruction is stored in the literal pool buffer; and
responsive to determining that the literal data corresponding to the PC-relative load instruction is stored in the literal pool buffer:
retrieve, within the instruction processing portion of the execution pipeline circuit by a literal data access logic circuit, the literal data from the literal pool buffer; and
execute the PC-relative load instruction using the literal data as an immediate value to be loaded.

10. The non-transitory computer-readable medium of claim 9, wherein:
the PC-relative load instruction comprises an offset; and
the computer-executable instructions cause the processor to:
determine that the PC-relative load instruction can be serviced using the literal data available to the instruction processing portion of the execution pipeline circuit by causing the processor to determine, based on the offset, that the literal data is within the fetch window; and
retrieve the literal data within the instruction processing portion of the execution pipeline circuit by causing the processor to retrieve the literal data from within the fetch window.

11. The non-transitory computer-readable medium of claim 9, wherein the computer-executable instructions cause the processor to determine that the PC-relative load instruction can be serviced using the literal data available to the instruction processing portion of the execution pipeline circuit at a specified decision point within the execution pipeline circuit.

12. The non-transitory computer-readable medium of claim 9, wherein:
the PE further comprises a loop buffer; and
the computer-executable instructions cause the processor to:
determine that the PC-relative load instruction can be serviced using the literal data available to the instruction processing portion of the execution pipeline circuit by causing the processor to detect that the PC-relative load instruction is within a loop, and that there exist no store instructions to a memory address of the literal data within the loop; and
retrieve the literal data within the instruction processing portion of the execution pipeline circuit by causing the processor to retrieve the literal data from the loop buffer; and
the computer-executable instructions further cause the processor to store the literal data within the loop buffer for use in subsequent iterations of the loop.

* * * * *